(12) United States Patent
Hammerschmidt

(10) Patent No.: US 7,434,740 B2
(45) Date of Patent: Oct. 14, 2008

(54) METHOD AND APPARATUS FOR POSITION DETECTION

(75) Inventor: Dirk Hammerschmidt, Villach (AT)

(73) Assignee: Infineon Technologies AG, Munich (DE)

( * ) Notice: Subject to any disclaimer, the term of this patent is extended or adjusted under 35 U.S.C. 154(b) by 438 days.

(21) Appl. No.: 11/045,505

(22) Filed: Jan. 28, 2005

(65) Prior Publication Data

US 2005/0189418 A1 Sep. 1, 2005

(30) Foreign Application Priority Data

Jan. 28, 2004 (DE) .................. 10 2004 004 281

(51) Int. Cl.
*G06K 19/06* (2006.01)

(52) U.S. Cl. .................. 235/494; 235/454

(58) Field of Classification Search .......... 235/494, 235/454, 462.03; 324/207.25; 382/151
See application file for complete search history.

(56) References Cited

U.S. PATENT DOCUMENTS

| | | | |
|---|---|---|---|
| 4,181,884 A * | 1/1980 | Shirasaki et al. | 324/207.25 |
| 4,782,329 A | 11/1988 | Iijima et al. | |
| 5,239,177 A * | 8/1993 | Cunniff | 250/231.18 |
| 5,640,377 A * | 6/1997 | Watanabe et al. | 369/53.3 |
| 5,712,574 A * | 1/1998 | Street | 324/714 |
| 5,731,702 A | 3/1998 | Schroeder et al. | |
| 5,917,182 A * | 6/1999 | Ishizuka | 250/237 G |
| 6,034,934 A * | 3/2000 | Miyake et al. | 369/53.28 |
| 6,411,376 B1 * | 6/2002 | Southam et al. | 356/237.1 |
| 6,715,368 B1 * | 4/2004 | Toratani et al. | 73/862.325 |
| 2003/0121979 A1 * | 7/2003 | D'Haens et al. | 235/462.03 |

FOREIGN PATENT DOCUMENTS

| | | |
|---|---|---|
| DE | 39 08 248 A1 | 9/1990 |
| DE | 196 04 968 A1 | 8/1997 |
| EP | 0 685 707 A1 | 12/1995 |

* cited by examiner

*Primary Examiner*—Ahshik Kim
(74) *Attorney, Agent, or Firm*—Maginot, Moore & Beck

(57) ABSTRACT

The invention relates to a method and an apparatus (4) for detecting the position of a sequence of markings (2) on a carrier (1) in relation to a detector (3) for detecting the markings (2). In accordance with one embodiment, the sequence of markings (2) detected by the detector are compared with at least one reference sequence (5) corresponding to the arrangement of the markings (2) on the carrier (1). In order to be able to reliably detect the position and rapidly identify errors, a comparison of a sensing sequence of markings (2) detected by the detector (3) with sections of the reference sequence (5) is carried out and an error signal is generated if the comparison does not result in complete correspondence. In this way, the function of the detector (3) can be checked particularly reliably. This method is advantageously implemented in a data processing device (4) that is present anyway, with the result that no additional components are required.

19 Claims, 1 Drawing Sheet

US 7,434,740 B2

METHOD AND APPARATUS FOR POSITION DETECTION

CROSS-REFERENCE TO RELATED APPLICATIONS

This application claims priority to German Patent Application no. 10 2004 004 281.0, filed Jan. 28, 2004.

FIELD OF THE INVENTION

The present invention relates to a method and apparatus for detecting the position of a sequence of markings on a carrier in relation to a detector for detecting the markings.

BACKGROUND

For the purpose of position detection, it is known to provide a carrier that is movable in relation to a detector with markings that can be detected by the detector. On the basis of the markings detected by the detector, it is possible, with knowledge of the arrangement of the markings on the carrier, to make statements about the position and/or the movement of the carrier in relation to the detector. Position detection of this type is generally also referred to as incremental position detection.

The markings on the carrier may in this case be set up in such a way that they comprise items of information about the angular position at which they are situated, so that a statement about the position of the carrier can be made upon detection even of one marking. In this case, the information content of the individual markings may be so high that, with the detection just of a single marking, the position of the carrier can be detected precisely to one marking. Furthermore, the information content of the individual markings may also be lower, so that it is necessary first to detect a sequence of a few successive markings before a statement about the position of the carrier is possible.

Thus, by way of example EP 685 707 A1 discloses a method and an apparatus for detecting the angular position of a crankshaft, in the case of which a disk-shaped carrier is provided with an irregular pattern on the circumference, said pattern being detected by two magnetoresistive sensors. The pattern of markings on the carrier is furthermore stored as a reference sequence. For the purpose of position detection, a sequence of detected markings, which is shorter than the reference sequence, is compared with sections of the reference sequence until correspondence can be ascertained. This method disadvantageously results in an erroneous position detection as soon as the sensors no longer detect individual markings correctly.

U.S. Pat. No. 5,731,702 discloses an apparatus for detecting an annular position, in the case of which two parallel tracks of magnetic markings are provided on a wheel, said markings being sensed by two sensors for position detection. In this case, the output signals of the two sensors are monitored with regard to cable fracture or short circuit in order to identify errors during the detection of the markings. If one sensor has been identified as faulty, the output signal of the other sensor is evaluated with respect to time in order to obtain items of information about the position of the carrier. In this case, it is disadvantageous that an additional circuit is required for identifying a cable fracture or a short circuit and it is not possible to detect a small disturbance which, by way of example, on account of an altered distance between the marking and the detector, although it does not result in a recognizably impermissible signal in the detector, nevertheless results in an erroneous detection of the marking.

Furthermore, U.S. Pat. No. 4,782,329 discloses an apparatus for position detection, in the case of which the position of a carrier with markings is determined by means of a phase locked loop that is tracked to the detected markings, the markings representing a uniform sequence.

The present invention is based on the object of providing a method and an apparatus with which the certainty and reliability of the position detection can be increased.

SUMMARY

In accordance with one embodiment of the invention, a comparison of a sensing sequence of markings detected by the detector with sections of the reference sequence is carried out and an error signal is generated if the comparison does not result in complete correspondence.

It is thus possible to logically check the detection of the markings at the end of the signal chain for all previous stages of the marking detection, with the result that it is possible to check errors at the detector, in the case of the signal processing downstream of the detector and also in the case of the interaction between the markings and the detector.

In the case of the invention, it is unimportant whether the sequence of markings is uniform or irregular or how the information content of the individual markings is. In addition to the order in which the individual markings succeed one another, the sequence of markings also comprises the distances prevailing between successive markings.

By way of example, the markings may be equidistant, it advantageously being ensured that adjacent markings can be distinguished. This may be achieved by means of the information contents of the markings themselves, for example by virtue of the latter also containing an item of information for the transition between two markings. By way of example, it is possible to use markings whose information contents vary from each marking to the next. In this case, it must also be provided that the information contents of the markings, in the signal processing chain, can assume at least three defined states in order, in addition to the change between two successive markings, also to be able to indicate an arbitrarily selectable item of information that can be used to form the sensing sequence and reference sequence. By way of example, it is possible, for this purpose, to use markings which are set up in such a way that they generate a return-to-zero signal in the signal processing chain.

In addition, however, it is also possible to use other methods for simultaneous clock and data recovery which make it possible to distinguish two successive markings. By way of example, the speed and/or acceleration of the carrier may also be used for this purpose, which may also be detected by means of a sensor that is different from the detector.

Upon generation of the error signal, the detection of the markings, the comparison with the reference sequence, the reference sequence itself or the outputting of the detected markings may be set up differently in order to eliminate the cause of the error signal. The functionality can thus be preserved in the case of an alteration to the apparatus, for example if markings are detected differently on account of contamination, wear or mechanical deformation of components. This is appropriate particularly in those cases in which the altered detection of markings remains constant. In such cases, in an advantageous manner, those positions are indicated and/or stored in the case of which such a correction of the apparatus has been performed. By means of the outputting of the markings being set up in an altered manner, it is possible to take account of the case where the markings are detected incorrectly at at least one position of the carrier, but the position can be assigned unambiguously on the basis of other markings and the detected sequence of markings at the erroneous location can be replaced by the information from the reference sequence, with the result that the output signal corresponds to the reference sequence expected by the user, even though said reference sequence does not correspond to the measurements at this position.

The detection of the markings, the comparison with the reference sequence, the reference sequence itself or the outputting of the detected markings may be set up differently in particular in a manner dependent on how often the cause of the error signal occurs in recurring fashion. What can thus be achieved is that the alteration of the apparatus is performed only in those cases in which an error occurs during the detection of the markings or the error signal occurs in recurring fashion and the apparatus remains unchanged if the error was only temporary. For this purpose, it is possible to monitor how often the error signal occurs relative to a specific time period, a specific number of movements of the carrier or a specific scope of movement of the carrier. Furthermore, for this purpose, it is also possible to compare with one another how often a specific location of the carrier at which the error signal occurs is identified without occurrence of the error signal and how often with an error signal occurring.

The detection of the markings, the comparison with the reference sequence, the reference sequence itself or the outputting of the detected markings may also be set up differently in a manner dependent on the amplitude of signals occurring during the detection of the markings. In particular, such corrections during the position detection are carried out only in the case of small amplitudes.

In a particularly advantageous embodiment, the invention is implemented in a data processing device which is also used for processing the signals supplied by the detector, with the result that no additional components are required and the invention can be realized with virtually no additional costs. In this case, it is also possible to check the marking detection of a plurality of detectors.

An irregular sequence of markings or of information contents of the markings on the carrier is advantageously used. Said sequence is compared with a reference sequence which is known and, by way of example, may be stored or calculated on the basis of known conformities to laws, which depends on the arrangement of the markings on the carrier. In this case, a sensing sequence of the markings detected by the detector is compared with sections of the stored reference sequence until a correspondence is found. On the basis of the location of the correspondence or the corresponding section, it is possible to determine the offset of the sensing sequence with respect to the reference sequence and thus the position of the carrier in relation to the detector.

For the comparison, it is possible to use sections of the reference sequence which have a fixed length or a number of markings and, in particular, the same number of markings as the sensing sequence.

The invention can be applied to linear sensors, in the case of which the carrier and the detector are displaceable in relation to one another, and to rotary position or angle sensors, in the case of which the carrier rotates in relation to the detector.

In the case of a rotary position sensor, the sequence of markings fitted on the sensor is repeated with each revolution. This must therefore be taken into account during the comparison of the sensing sequence detected by the detector with the reference sequence.

Use is preferably made of a sequence of markings on the carrier which is not repeated within a revolution, so that the angular position of the carrier can be determined unambiguously.

The number of markings in a sensing sequence detected by the detector which is necessary for position determination depends, in particular on the pattern used in the case of an irregular succession of the markings in relation to the information content of the individual markings and the succession thereof in the sensing sequence or in the reference sequence.

A phase locked loop or a PLL is advantageously used in an apparatus for detecting the rotational position for the purpose of comparing the markings detected by the detector with the reference sequence of markings. In this case, the stored reference sequence is repeated endlessly with a variable speed that is tracked by the control loop in such a way that the repeated reference sequence is synchronous with the sequence of markings detected by the detector. This has the advantage that a reliable statement about the rotary position of the carrier is possible even in the case of small temporary detection errors of the detector. The control loop with the PLL supplies the information about the rotational speed as further information.

Moreover, it is possible to determine the position of the carrier in relation to the detector both in the case of a rotatable carrier and in the case of a longitudinally displaceable carrier with the aid of a cross-correlation, in which method the marking sequence detected by the detector and the stored reference sequence are correlated with a variable offset. The cross-correlation yields for the offset a maximum by which the reference sequence and the marking sequence detected by the detector are offset. Moreover, the amplitude of the maximum of the cross-correlation yields information about how well the stored reference sequence and the marking sequence detected by the detector correlate or correspond. This means that the maximum of the cross-correlation is reduced in the case of erroneous detection of markings. Moreover, depending on the marking sequence used and the number of erroneously detected markings, the offset of the maximum of the cross-correlation can nevertheless be determined correctly, so that, under certain circumstances, even in the case of erroneously detected markings, a correct determination of the position of the carrier may be possible if not too many markings have been detected incorrectly.

In an advantageous development, it is attempted to make a statement about the position of the carrier even in the case in which an erroneous detection of at least one marking has been determined. For this purpose, that position of the carrier in relation to the detector is determined in which the marking sequence detected by the detector can still be caused to correspond the best to the reference sequence, or in which a correspondence can be produced assuming a least possible number of erroneously detected markings.

The markings may be magnetic, in which case regions of the carrier may be magnetized and the markings thereof may be detected by means of a Hall sensor, or the carrier may be formed in such a way that it alters the magnetic flux in the vicinity of a sensor in accordance with the markings. In addition, the markings may also be optical.

In an advantageous embodiment of the present invention, the apparatus for carrying out the method is implemented together with the detector in one unit. In this way, it is possible to provide a sensor which checks itself and thus affords an increased reliability. In this case, the sensor may, on the one hand, output the detected position and, on the other hand, output the error signal if it ascertains the erroneous detection of at least a few markings. In this case, the output signal describing the detected position and the error signal may also be output via a common line, for example by virtue of providing a different range of values for the outputting of the detected position than for the outputting of the error signal, with the result that a device connected to the sensor can ascertain whether a detected position or an item of error information is output via the line.

In this case, the error signal may contain information about how many markings have been detected erroneously and/or whether the position can still be reliably detected.

The invention is explained in more detail below on the basis of a preferred exemplary embodiment with reference to the accompanying drawing.

DETAILED DESCRIPTION

Figure 1:
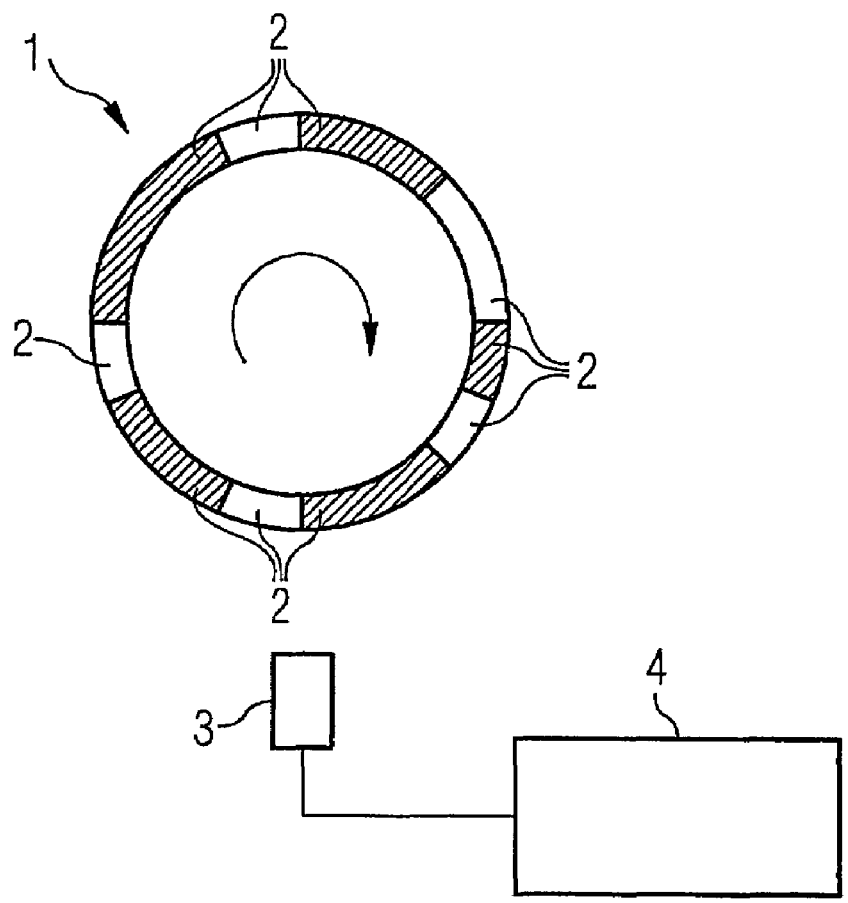
FIG. 1 shows the diagrammatic construction of a device for detecting a rotary position.

The arrangement illustrated in FIG. 1 comprises a carrier 1, which is mounted in rotatable position and the angular position of which is intended to be determined. The carrier 1 has magnetic markings 2 on its circumference, which markings can be detected by a detector 3. For this purpose, the detector 3 comprises a Hall sensor for detecting the magnetic markings 2. Furthermore, the detector 3 comprises a suitable circuit for conditioning the output signal of the Hall sensor. Furthermore, a data processing device 4 is connected to the detector 3, and evaluates the output signal of the detector 3 in order to determine the rotary position of the carrier 1.

Figure 2:
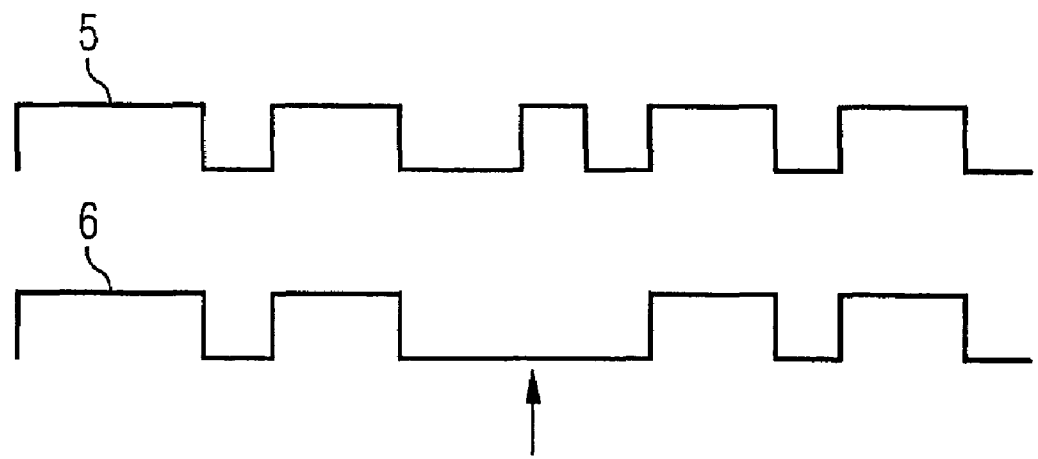
FIG. 2 shows a reference sequence and a marking sequence detected by the arrangement in FIG. 1 in the case of an erroneously detected marking.

A reference sequence 5, illustrated in FIG. 2, is stored in the data processing device 4. The reference sequence 5 corresponds to the succession of the markings 2 on the carrier 1 over a complete revolution of the carrier 1. In the case of correct detection of all the markings 2 by the detector 3, the marking sequence detected by the detector 3 corresponds to the reference sequence 5.

FIG. 2 furthermore illustrates the marking sequence 6 detected by the detector 3 for a case of error. In this case, an error has occurred at the location identified by the arrow, in the case of which error a marking 2 on the carrier 1 has not been detected. The reasons for this may be, by way of example, an alteration of the magnetic properties of this marking, an increased distance between the carrier 1 and the detector 3, or electrical or magnetic interference affecting the sensor or the apparatus, such as, by way of example, supply voltage fluctuations or EMC pulses. A further reason may be asymmetries of the arrangement for example in relation to the magnetization of the carrier in the case of magnetic markings.

There is implemented in the data processing device 4 a digital PLL or a digital phase locked loop, in which the reference sequence 5 is continuously repeated with a controllable speed that is set by means of a control in such a way that the repeated reference sequence 5 runs synchronously with the sensing sequence 6 supplied by the detector 3. For this purpose, on the one hand, a phase comparison between edges of the reference sequence 5 and the sensing sequence 6 is carried out. In order to prevent the PLL from locking onto an incorrect edge of the sensing sequence 6, a mechanism that can ascertain a correspondence between the reference sequence 5 and the sensing sequence 6 is furthermore provided. As soon as the correspondence is established apart from a mutual offset that is smaller than the smallest marking 2, the PLL effects control on the basis of a phase comparison between the edges.

Moreover, the mechanism also ascertains the degree of correspondence between the sensing sequence 6 and the reference sequence 5 in order to recognize errors during sensing. For this purpose, the sensing sequence and the reference sequence are displaced relative to one another until the best possible correspondence is achieved. If complete correspondence could nevertheless not be achieved, this admits the conclusion of an erroneous detection of at least one marking 2. In this case, and depending on the number of erroneously identified markings 2, a correct determination of the rotational position of the carrier 1 may nevertheless be possible, under certain circumstances, depending on the succession of markings 2 used.

As soon as the data processing device 4 determines the erroneous detection of at least one marking 2, the data processing device 4 emits an error signal indicating the disturbance. In this case, the emitted error signal may additionally specify the extent of the disturbance or the number of erroneously determined markings 2. Furthermore, the error signal may also contain an indication of whether the rotational position of the carrier 1 could still be detected reliably despite erroneously detected markings 2 or whether the detected position is reliable.

The invention claimed is:

1. A method of detecting the position of a sequence of markings on an object in relation to a detector, said sequence of markings having a plurality of portions and said method comprising:
   a) detecting, using the detector, the plurality of portions of the sequence of markings on the object;
   b) generating, using the detector, an output based upon the plurality of portions of the sequence of markings;
   c) supplying a reference sequence previously stored in a storage medium separate from the markings on the object and corresponding to the sequence of markings on the object;
   d) comparing a plurality of portions of the generated output with a plurality of portions of the reference sequence;
   e) generating an error signal if the comparison does not result in a complete correspondence between the plurality of portions of the generated output and the plurality of portions of the reference sequence; and
   f) modifying, responsive to the generation of the error signal, at least one step of a group consisting of step a, step b, step c and step d, to increase a correspondence between a subsequent generated output and the sequence of markings, said modification based at least in part on a number or recurring generations of error signals for a plurality of comparisons.

2. The method of claim 1, wherein:
step f) further comprises modifying at least one of the group consisting of step a, step b, step c, and step d, based upon the determined amplitude of detection signals obtained in step a.

3. The method of claim 1, further comprising:
identifying the marking in the sequence of markings that corresponds to the one of the plurality of portions of the reference sequence that does not correspond to any of the plurality of portions of the generated output; and
storing the identification of position of object associated with the identified marking.

4. The method of claim 1, wherein:
step d) comprises
comparing the plurality of portions of the generated output to a first plurality of portions of the reference sequence,
determining the extent of correspondence between the plurality of portions of the generated output and the first plurality of portions of the reference sequence,
comparing the plurality of portions of the generated output to a second plurality of portions of the reference sequence, and
determining the greatest of correspondence between the plurality of portions of the generated output and the second plurality of portions of the reference sequence; and
further comprising a step of determining the position of the object comprising,
selecting, from the first plurality of portions of the reference sequence and the second plurality of portions of the reference sequence, a plurality of portions of the reference sequence having the largest extent of correspondence with the plurality of portions of the generated output, and
determining the position of the object in relation to the detector based upon the selected plurality of portions.

5. The method of claim 1, further comprising providing a sequence of markings positioned on the object such that the position of the sequence of markings may be correctly detected even in a case of erroneous detecting of at least one marking.

6. The method of claim 1, wherein the sequence of markings comprises a number of markings and temporal intervals between markings.

7. The method of claim 6, wherein the number of markings in the sequence of markings are interleaved with a sequence of irregular separation distances such that each marking is separated from each adjacent marking by a separation distance.

8. The method of claim 7, wherein each separation distance of the sequence of irregular separation distances is different from each of the other separation distance of the sequence of irregular separation distances.

9. The method of claim 1, further comprising:
determining a speed of the object with respect to the detector based upon the detected at least a portion of the sequence of markings on the object; and
defining an expected detection window for at least one of the sequence of markings on the object based upon the determined speed.

10. The method of claim 1, further comprising:
determining a speed of the object with respect to the detector using a speed sensor; and
defining an expected detection window for at least one of the sequence of markings on the object based upon the determined speed.

11. The method of claim 1, wherein step b further comprises generating the output as digital output.

12. The method of claim 1, further comprising the step of providing the sequence of markers positioned on the object by:
providing a first marker on the object operable to identify a first state;
providing a second marker on the object adjacent to the first marker, the second marker operable to identify a second state; and
providing a third marker on the object adjacent to the second marker, the third marker operable to identify a third state, wherein each of the first, the second and the third states are states different from each other of the first, second and third states.

13. The method of claim 1, wherein:
the method further comprises determining a speed of the object carrier with respect to the detector using a speed sensor; and
step a further comprises;
detecting a first marker of the sequence of markers, and
detecting a second marker of the sequence of markers, wherein the second marker follows the first marker in the sequence of markers and wherein a determined speed of the object is used to facilitate the detection of the second marker.

14. An apparatus for determining the position of an object in relation to a detector, said object carrying a sequence of markings and said apparatus comprising:
a housing; and
a microprocessor mounted within the housing and programmed to
receive a signal indicative of the detection by a first detector of a first plurality of markings of the sequence of markings on the object;
compare the received signal with at least a portion of a reference signal previously stored in a storage medium separate from the markings on the object and corresponding to the sequence of markings on the object,
determine on the basis of the comparison a correspondence between the received signal and the at least a portion of the reference signal,
determine the position of the object in relation to the first detector based upon the determined correspondence,
generate an output indicative of the determined position of the object in relation to the detector,
generate an error signal if a sub-portion of the at least a portion of the reference signal does not correspond to the received signal, and
execute a routine operable to eliminate generation of an error signal based upon a failure to detect the marking in the sequence of markings that corresponds with the sub-portion of the at least a portion of the reference signal.

15. The apparatus of claim 14, wherein the first detector is mounted to the housing.

16. The apparatus of claim 14, wherein the microprocessor is further programmed to determine a speed of the object with respect to the first detector based upon the signal indicative of the detection of the sequence of markings.

17. The apparatus of claim 14, wherein:
the apparatus further comprises a speed detector operably connected to the microprocessor and operable to generate a signal indicative of a speed of the object with respect to the first detector; and
the microprocessor is further programmed to determine the speed of the object with respect to the detector based upon the signal indicative of the detection of the sequence of markings.

18. The apparatus of claim 17, wherein:
the speed detector is mounted to the housing; and
the first detector is mounted to the housing.

19. A method for use in detecting the position of a sequence of markings on an object in relation to a detector comprising:

a) detecting, using the detector, at least a portion of the sequence of markings on the object;
b) generating, using the detector, an output based upon the detected at least a portion of the sequence of markings;
c) providing a reference sequence corresponding to the sequence of markings on the object, the reference sequence previously stored in a storage medium separate from the markings on the object and corresponding to the sequence of markings on the object;
d) comparing the generated output based upon the detected at least a portion of the sequence of markings with the reference sequence;
e) generating an error signal if the comparison does not result in complete correspondence between the generated output and the reference sequence;
f) modifying, responsive to generation of the error signal at least one step of the group consisting of step a, step b, step c, and step d, to increase a correspondence between a subsequent generated output and the sequence of markings.

* * * * *